United States Patent [19]
McNeill

[11] 3,721,356
[45] March 20, 1973

[54] VEHICLE TOWING DEVICE

[76] Inventor: John M. McNeill, 609 Lavon Court, P.O. Box 636, Kissimmee, Fla. 32741

[22] Filed: April 28, 1971

[21] Appl. No.: 138,097

[52] U.S. Cl. .............................. 214/86 A, 280/402
[51] Int. Cl. ............................................. B60p 3/12
[58] Field of Search .............. 214/77, 86 A; 280/402

[56] References Cited

UNITED STATES PATENTS

| 3,620,393 | 11/1971 | Bubik | 214/86 A |
| 3,512,664 | 5/1970 | Tolle | 214/86 A |
| 3,522,892 | 8/1970 | Vegors | 214/86 A |
| 3,137,401 | 6/1964 | Curtis | 214/86 A |
| 2,808,160 | 10/1957 | Londe | 214/86 A |

FOREIGN PATENTS OR APPLICATIONS

| 941,345 | 4/1956 | Germany | 214/86 A |

Primary Examiner—Albert J. Makay
Attorney—Duckworth and Hobby

[57] ABSTRACT

A vehicle towing device having a wheeled frame adapted for coupling to one vehicle for towing a second vehicle. The frame is wheeled and has a winch attached to it for lifting a swinging arm pinned at one end to the frame and coupled by means of a cable from the winch to the other end of a swinging arm which also is attached to one or more flexible belts which are adapted to swing under the bumper of a disabled vehicle, with the other end of the belt adapted for connection to the axle in a manner that can be adjusted to place a belt directly under the bumper so that when the winch reels in the cable, it lifts the swing arm to lift the belt on the bumper for lifting one end of the disabled vehicle for towing.

9 Claims, 7 Drawing Figures

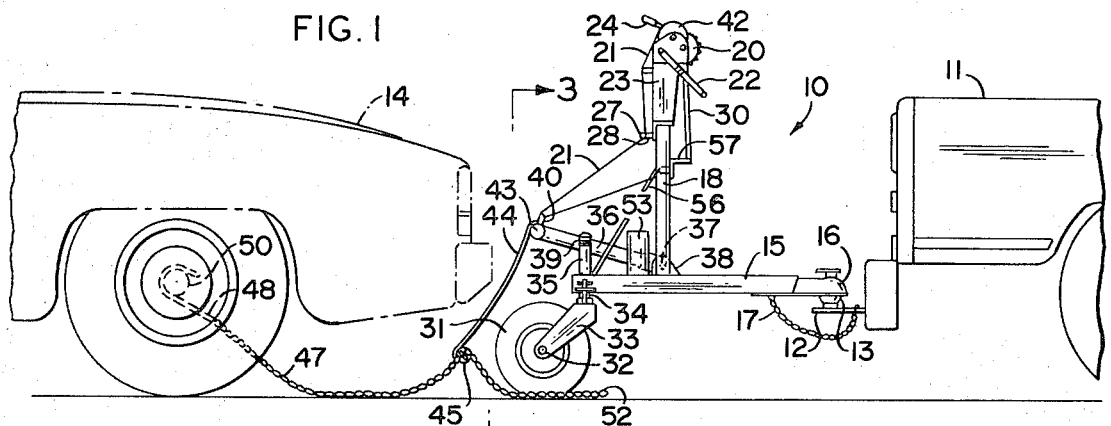

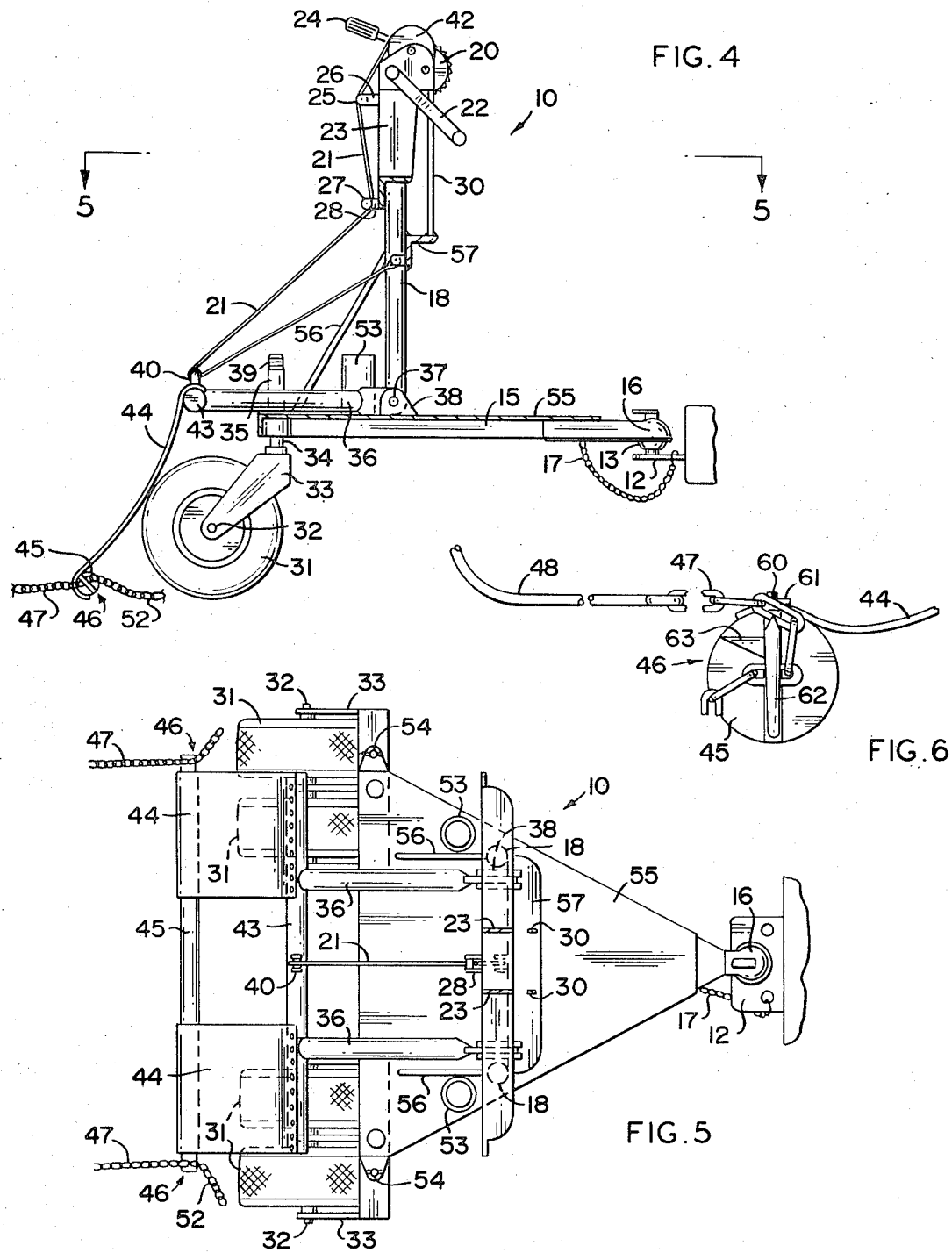

VEHICLE TOWING DEVICE

BACKGROUND OF THE INVENTION

The present invention relates to towing devices and particularly to devices for connecting to one vehicle for convenient towing of a second disabled vehicle.

In the past, the most common types of towing vehicles have been wreckers or wrecker-type trucks which were equipped with winches and derricks having fixed booms for attaching to a vehicle for lifting one end and towing to a service station or repair site. These vehicles, however, have been quite expensive, requiring special trucks which cannot generally be fully utilized because of being specially adapted for towing vehicles and thus interfering with the normal load carrying portions of the truck.

It has also been suggested by others in the past to provide devices for attaching to an automobile or similar vehicle by means of a trailer coupling, which devices have wheels and provide winches for lifting one end of a disabled vehicle for towing. These devices avoid having to keep special expensive wreckers for towing disabled vehicles at small service stations, and the like. One such prior art device teaches attaching a chain to the disabled vehicle's bumper and having a wheel device for placement directly under the axle for lifting one end of the vehicle as shown in U. S. Pat. No. 2,706,055. Another towing attachment device for motor vehicles has a portable derrick with a winch for lifting the bumper of a disabled vehicle in U. S. Pat. No. 2,553,229, and finally, U. S. Pat. No. 2,152,704 teaches a vehicle towing device for attaching to one vehicle for towing a disabled vehicle having a winch with a cable that connects to a bumper and slides the disabled vehicle up a ramp during towing. These prior art devices have been satisfactory in many cases but in most cases they are connecting to bumpers which are not designed for supporting the loads of the vehicles during a towing operation and also tend to scratch or mar the coatings on the bumpers and related parts of the cars. It is accordingly one object ot the present invention to provide a vehicle towing device for connection to one vehicle for towing a second disabled vehicle which provides protection against damage to the coatings or surfaces of the disabled vehicle's bumper and provides the direct towing force directly to the axle of the vehicle rather than to the bumper, yet is simple and reliable in construction and easy to operate or being adapted for attachment to a great variety of vehicles.

SUMMARY OF THE INVENTION

The present invention relates to vehicle towing devices and especially to those vehicle towing devices adapted for connection to one vehicle for towing a second vehicle such as a disabled vehicle. A wheeled frame is provided with a coupling for coupling the wheeled frame to the vehicle that is to be used for towing the second vehicle, which coupling may be similar to couplings utilized for trailers. The frame has a winch attached to it with a cable connected to the winch and also one or more swing arms that are flexibly pinned at one end to the frame and has a winch cable connected to the other end of the swing arm so that operating the winch will move the swing arm on pins. One or more flexible belts are connected to the swing arms and are adapted for connecting to the axle at the other end of the flexible belt so that operating the winch will lift the swing arms to raise the belt and tighten it with respect to the axle to lift the flexible belt onto the bumper of the vehicle for lifting the vehicle and towing it. A means for connecting the belt to the axle can be by an axle hook connected to a chain which is in turn connected to the belt in a manner that the chain can be adjusted as to length whereby the device can be rapidly hooked to an axle, rapidly adjusted as to length and rapidly lifted for towing. The swing arms can be connected to the belts by means of a tubular bar connected between the arms having the belts connected to the bar. Wheel locking and spring oscillation dampening means improve the operation of the device by reducing wheel oscillation when the device is being pulled by a vehicle.

BRIEF DESCRIPTION OF THE DRAWING

Other objects, features and advantages of this invention will be apparent from a study of the written description and the drawings in which FIG. 1 is a side sectional view of one embodiment of the present invention shown connected to a towing vehicle and to a disabled vehicle;

FIG. 2 is a sectional view similar to that of FIG. 1 showing the disabled vehicle being lifted for towing;

FIG. 3 is a sectional view taken along line 3—3 of FIG. 1;

FIG. 4 is a side sectional view of the embodiment of FIG. 1;

FIG. 5 is a top sectional view taken along line 5—5 of FIG. 4;

FIG. 6 is a sectional view of a connecting means for the chain shown in one position; and FIG. 7 illustrates the connector of FIG. 6 is a locked position.

DESCRIPTION OF THE PREFERRED EMBODIMENT

Referring now to the drawing and especially to FIGS. 1, 2 and 4, one embodiment of the towing device 10 can be seen connected to a truck 11 by means of a trailer type hitch 12 having a ball connection 13 with the device 10 being hooked up to a disabled vehicle 14. Towing device 10 has a frame 15 with a coupling 16 which may be a standard trailer hitch type coupling which works in conjunction with the trailer hitch 12 for locking the coupling on the ball 13 for towing of the towing device 10 by the vehicle 11. A safety chain 17 is provided in the event of the loss of a coupling during the towing operation. Frame 15 has an upright member 18 with a winch 20 located thereon, with the winch having cable 21 wrapped therearound and a handle 22 for operating the winch. Brackets 23 are also provided on the upright frame portion 18 for fixedly attaching the winch 20 to the frame and a handle 24 is provided for locking the winch in position during the towing operation. The winch may of course be of any commercial type — either hand or electrically operated as desired. The cable 21 wraps around a pulley or sheave 25 which is connected to the bracket 23 by means of a bracket 26 and then wraps around a second pulley 27 which is connected to the upright frame members 18 by a bracket 28. A reenforced frame member 30 is also provided for giving greater strength to the winch during the operation of the device. Frame 15 also has a pair of wheels 31 riding on axle members 32 connected to the axle engaging members 33 which in turn ride by means of a shaft 34 for riding and engaging sleeve 35 connected to the frame 15, allowing the wheels 31 to follow the towed vehicle 11. Swing arms 36 may be one, two or more arms pinned by individual pins or by a shaft 37 to a bracket 38 on frame 15 in a manner that the arms 36 can swing on the pins 37. These arms can also be a rigid framework connecting several arms as desired and may have a pulley or sheave 40 on one end thereof along with the cable 21 being wrapped therearound and connected to the upright frame member 18 of frame 15 by means of connecting brackets 41. When the winch 20 is operated, the cable 21 will be drawn to wrap around the winch drum 42 to shorten the length of cable 21 running to its anchor position 41 and lift the swing arms 36 on the pins 37. Swing arms 36 have a tubular bar 43 connected therebetween in the present invention but any number of arms 36 can be used as can any shaped arm, such as one flat reinforced member. Accordingly when arm or swing arm is referred to herein, relatively rigid member capable of being movably held at one end is suitable and included. The bar 43 has one or more flexible belts 44 connected to it either by bolting the belts directly to the bar 43 or wrapping them around the bar 43 and sewing it back to itself. Belt 43 is in turn connected to another tubular bar 45 which may be similar to bar 43, which bar 45 has a connection 46 which will be described in more detail in connection with FIGS. 6 and 7 but which provides for easy adjustment of the length of a chain 47, and having an axle hook 48 connected to the other end of the chain. By placing the axle hook 48 on an axle 50 of a vehicle 14, as shown in FIG. 1, the front end of the vehicle 14 can be lifted with the flexible belt portion 44 engaging a bumper 51 of vehicle 14 during the lifting and towing operations so that the bumpers will not be marred or scratched and the towing force can be applied directly to the axle 50 of the vehicle. A length of chain 52 extending beyond the connection 46 can be conveniently dropped into a storage container 53 attached to the frame 15 so as not to drag on the road during the towing operation.

As more clearly shown in FIGS. 3 and 5, the illustrated embodiment has four wheels 31 for carrying greater loads riding on a pair of axle members 32 and a pair of brackets 33 riding on a pair of shafts 34, each wheel also having a threaded locking member 54 for locking the wheels when not towing a disabled vehicle. A spring 39 applies a friction force against the wheel assembly which dampens oscillations of the wheel assembly. As can also be seen from these views, a pair of belts 44 have been provided riding on a single shaft 45 on one end and riveted or bolted to a single shaft 43 which shaft 43 in turn is operated by a single cable 21 connected between the belts.

It should however of course be clear that one large flexible belt or several flexible belts in different arrangements of the bars 43 and 45, along with the swinging arms 36 can be provided for without departing from the spirit and scope of the present invention. The frame member 15 is illustrated in FIG. 5 as having a platform portion 55 which strengthens the frame and has a more convenient attachment for the upright frame members 18 and related attachments. A reenforcing frame member 56 is also provided to resist towing force provided by the connections to the disabled vehicle during the towing operation and transverse frame members 57 may be used to reenforce the vertical frame as well as providing a platform for brackets 27 for holding the pulleys 28.

Referring now to FIGS. 6 and 7 — a more detailed view of the operation of the chain locking mechanism 46 is illustrated connected to the tubular bars 45. Tubular bars 45 are seen having belt 44 connected thereto by means of bolts 60 passing through washers 61 and being threadedly engaged to the bars 45. The chain 47 is seen in a disconnected position in FIG. 6 and in a locked position in FIG. 7, and having the hook 48 for connecting to the axle on one end of the chain. The chain is brought over a hook 62 then through the hook slot passing through the hook 62. The guard 63 is connected to the hook 62 and prevents the chain from being inserted from the wrong side. Thus the chain is inserted through the slot in the hook 62; the bar 45 is rolled a quarter of a turn wrapping the belt 44 part of a turn around the bar but bending the chain 47, 90 degrees between a pair of links 65 in FIG. 7 locking the chain in that position during the operation of the mechanism. A simple locking mechanism such as 46 has been found desirable in that it provides for a quick adjustment of the length of the chain for quick connection of the present towing apparatus to a vehicle. The chain needs to be varied because of the various distances on different vehicles between the axles of the vehicles and the bumpers. A chain has been illustrated as the preferred embodiment but is should be pointed out that the belt can be extended to the axle or a cable or rope could be used rather than a chain without departing from the scope of the invention.

It should also be clear that other locking mechanisms can be utilized in accordance with the present invention and other means for adjusting the length of the chain 47, if desired, and that other embodiments are contemplated, such as the rubber belting being of various types of materials, without departing from the spirit and scope of the present invention. One additional embodiment contemplated replaces the winch 42 with a hydraulic, pneumatic or screw jack which lifts the cable 21 rather than wrapping it on a winch drum. This lifting can be accomplished by wrapping the cable 21 around a drum, or the like, and anchoring the cable to the frame, then lifting the drum to double the length of cable lifted by the jack, with the cable sliding or rolling over the drum.

Accordingly, this invention is not to be construed as limited to the particular forms disclosed herein, since these are to be regarded as illustrative rather than restrictive.

I claim:

1. Vehicle towing apparatus adapted to be connected to one vehicle for towing a second vehicle comprising in combination:
    a. a wheeled frame having an upright membered secured to said frame;
    b. coupling means attached to said wheeled frame for movably coupling said frame to a vehicle;

c. lifting means attached to said upright member at the free end, said lifting means including a winch having a flexible cable means operatively connected thereon;

d. swing arm means having two end portions and being movably connected to said wheeled frame adjacent the secured end of the upright member at one end portion thereof and to said cable from said winch on the other end portion thereof for swinging said swing arm on said one end portion;

e. flexible belt means connected to the other said end portion of said swing arm means; and f. connecting means attached to belt means for connecting said belt means to said vehicle, whereby operation of said lifting means will swing said swing arm means on said frame lifting said flexible belt means for lifting a portion of said vehicle to be towed.

2. The apparatus according to claim 1 in which said connecting means include a chain having a hook member on one end and being attached to said belt means on the other end.

3. The apparatus according to claim 2 in which said chain is connected to said belt means by means of a locking means, said locking means being adapted for locking on any portion of said chain.

4. The apparatus according to claim 3 in which said belt means is connected at each end to a pair of tubular bars, said locking means being connected to one said bar and said swing arm means to the other said bar.

5. The apparatus according to claim 4 in which said arm means includes a pair of tubular arm members.

6. The apparatus according to claim 5 in which said belt means includes a pair of flexible belts.

7. The apparatus according to claim 1 in which lifting means is a hand operated winch and said flexible cable is a flexible metal cable.

8. The apparatus according to claim 3 in which said locking means has a member with a slot in it for passing said chain through; said member being adapted to rotate with said chain passing through said slot whereby a pair of links of said chain will be bent at an angle relative to each other to lock said chain at the position of the bend in said chain.

9. The apparatus according to claim 1 in which said wheeled frame has the wheels mounted to rotate in said frame with a spring force being applied to the wheel assembly, to dampen oscillations in said wheels.

* * * * *